United States Patent
Wright et al.

(10) Patent No.: US 9,527,491 B2
(45) Date of Patent: Dec. 27, 2016

(54) BRAKE CYLINDER LIMITING VALVE

(71) Applicant: NEW YORK AIR BRAKE, LLC, Watertown, NY (US)

(72) Inventors: Eric C. Wright, Evans Mills, NY (US); Jason Connell, Bethel Park, PA (US)

(73) Assignee: New York Air Brake, LLC, Watertown, NY (US)

( * ) Notice: Subject to any disclaimer, the term of this patent is extended or adjusted under 35 U.S.C. 154(b) by 195 days.

(21) Appl. No.: 14/460,830

(22) Filed: Aug. 15, 2014

(65) Prior Publication Data
US 2016/0046273 A1    Feb. 18, 2016

(51) Int. Cl.
*B60T 15/02*    (2006.01)
*B60T 13/66*    (2006.01)
*B60T 17/22*    (2006.01)

(52) U.S. Cl.
CPC ............ *B60T 15/021* (2013.01); *B60T 13/665* (2013.01); *B60T 17/228* (2013.01)

(58) Field of Classification Search
CPC ....... B60T 17/04; B60T 15/021; B60T 11/101; B61H 13/20
See application file for complete search history.

(56) References Cited

U.S. PATENT DOCUMENTS

| 6,375,277 | B1 * | 4/2002 | Carroll | B60T 7/10 303/15 |
|---|---|---|---|---|
| 2002/0038976 | A1 * | 4/2002 | Hart | B60T 17/04 303/30 |
| 2014/0102558 | A1 * | 4/2014 | Call | B60T 17/04 137/505 |
| 2014/0125115 | A1 * | 5/2014 | Gaughan | B60T 13/266 303/33 |

OTHER PUBLICATIONS

International Search Report Form PCT/ISA/220, International Application No. PCT/US2014/051285, pp. 1-9, Dated May 12, 2015.

* cited by examiner

*Primary Examiner* — Vishal Sahni
(74) *Attorney, Agent, or Firm* — Bond Schoeneck and King PLLC; David Nocilly

(57) ABSTRACT

A brake cylinder limiting valve having a first portion that determines actual brake cylinder pressure and a second portion that determines intended brake cylinder pressure based on brake pipe pressure reduction. The two portions are combined so that brake cylinder pressure will be vented if the actual brake cylinder pressure exceeds intended brake cylinder pressure by a predetermined threshold amount, which is preferably two and one-half times the brake pipe pressure reduction. An exhaust cut-off valve may be used to prevent venting of the brake cylinder pressure if it falls below a predetermined value.

17 Claims, 5 Drawing Sheets

BRAKE CYLINDER LIMITING VALVE

BACKGROUND OF THE INVENTION

1. Field of the Invention

The present invention relates to rail or freight car brake systems and, more particularly, to a brake cylinder limiting valves for an AAR-type freight car brake that prevents over-pressurization of the brake cylinder.

2. Description of the Related Art

Control valves used in freight car brake systems, such as the DB-60 control valve manufactured by New York Air Brake Corporation of Watertown, N.Y., or the AB-type control valves manufactured by Wabtec Corporation of Wilmerding, Pa., typically supply air pressure to the brake cylinder of a freight car. If the brake cylinder or the plumbing between the control valve and the car has a leak, however, the brake cylinder will not maintain the original set pressure. In addition to brake cylinder leakage, resulting in low brake cylinder pressure, the brake system can leak into the brake cylinder, resulting in high brake cylinder pressure.

Brake control systems on rail or freight cars that comply with AAR standards are referred to as displacement type system and the brake cylinder pressure is proportional to the size of the auxiliary reservoir and brake cylinder volumes, which are proscribed by AAR regulations and controlled by means of the brake control valve. Control of the brake cylinder pressure is in response to modulation of the brake pipe pressure by the train driver. Although these systems are very reliable, they operate in an open loop mode with the brake cylinder pressure being the result of the relationship between auxiliary reservoir and brake pipe pressures. As a result, there is no feedback of brake cylinder pressure for the purpose of closed loop control. Leakage into or out of the brake cylinder may therefore result in brake cylinder pressures that are higher or lower than desired without any recognition by the system that the pressures are abnormal. While recently improvement to AAR brake systems include the addition of brake cylinder maintaining valves that compensate for brake cylinder leakage, the issue of brake cylinder over-pressurization is still a problem and may occur as the result of leakage in the quick service limiting valve, in the auxiliary reservoir, in the emergency reservoir, in the auxiliary reservoir, or in the brake pipe pressure into the brake cylinder while the brakes are applied.

A brake failure that results in over-pressurization of the brakes on a car in train is very hazardous and may result in "hot wheels," which damages the wheels and raises the potential for a subsequent wheel failure and even train derailment. The train driver is usually unaware that a car has over-pressurized brakes due, in part, to the length of the train and the number of cars in the train. The only existing method of addressing this problem is to install a network of hot wheel detectors along a predetermined location in the continental rail system that can detect a hot wheel on a car using a thermal sensor, identify the car ID using an RFID tag, and then send an alarm to a dispatch center so that a dispatcher can contact the train driver. Such systems are costly, require significant modifications to the existing infrastructure, and are limited in geographic scope. As a result, rail car mounted system that can prevent over-pressurization of the brake cylinder and avoid the resulting hot wheel problem would be a significant safety improvement.

BRIEF SUMMARY OF THE INVENTION

The present invention comprises a brake cylinder limiting valve having a first portion that determined actual brake cylinder pressure and a second portion that determined intended brake cylinder pressure, and then allows for venting of the brake cylinder pressure if the actual brake cylinder pressure exceeds intended brake pipe pressure by a predetermined threshold. The intended brake pipe pressure is determined based on a reduction in brake pipe pressure relative to emergency reservoir pressure and the preferred threshold for venting is a brake cylinder pressure that is more than two and one-half times the brake pipe pressure reduction, plus a nominal amount for tolerance.

In one embodiment, the first portion comprises a first chamber in communication with a source of brake cylinder pressure, a second chamber in communication with atmospheric pressure, and a first diaphragm separating the first and second chambers and having a first wetted area, with the diaphragm configured to open a brake cylinder pressure exhaust port against the bias of a spring. The second portion comprises a third chamber in communication with a source of brake pressure, a fourth chamber in communication with a source of emergency reservoir pressure, and a second diaphragm separating the third and fourth chambers and having a second wetted area that is greater than the first wetted area by a threshold ratio, where the diaphragm is moveable to impart a second force via a floating pin that also biases the seat into the closed position. Thus, the brake cylinder pressure in the first chamber will be exhausted when it overcomes the bias force of the spring and any bias force being applied by the second diaphragm. The wetted area ratio of the second diaphragm to the first diaphragm is preferably 2.5 to 1, thereby providing for the same ratio of brake pipe pressure reduction to brake cylinder pressure increase required in an AAR compliant braking system. The brake cylinder limiting valve may be interconnected to the existing 4-port testing interface of a pipe bracket, or integrated into any number of locations in a conventional brake control valve.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
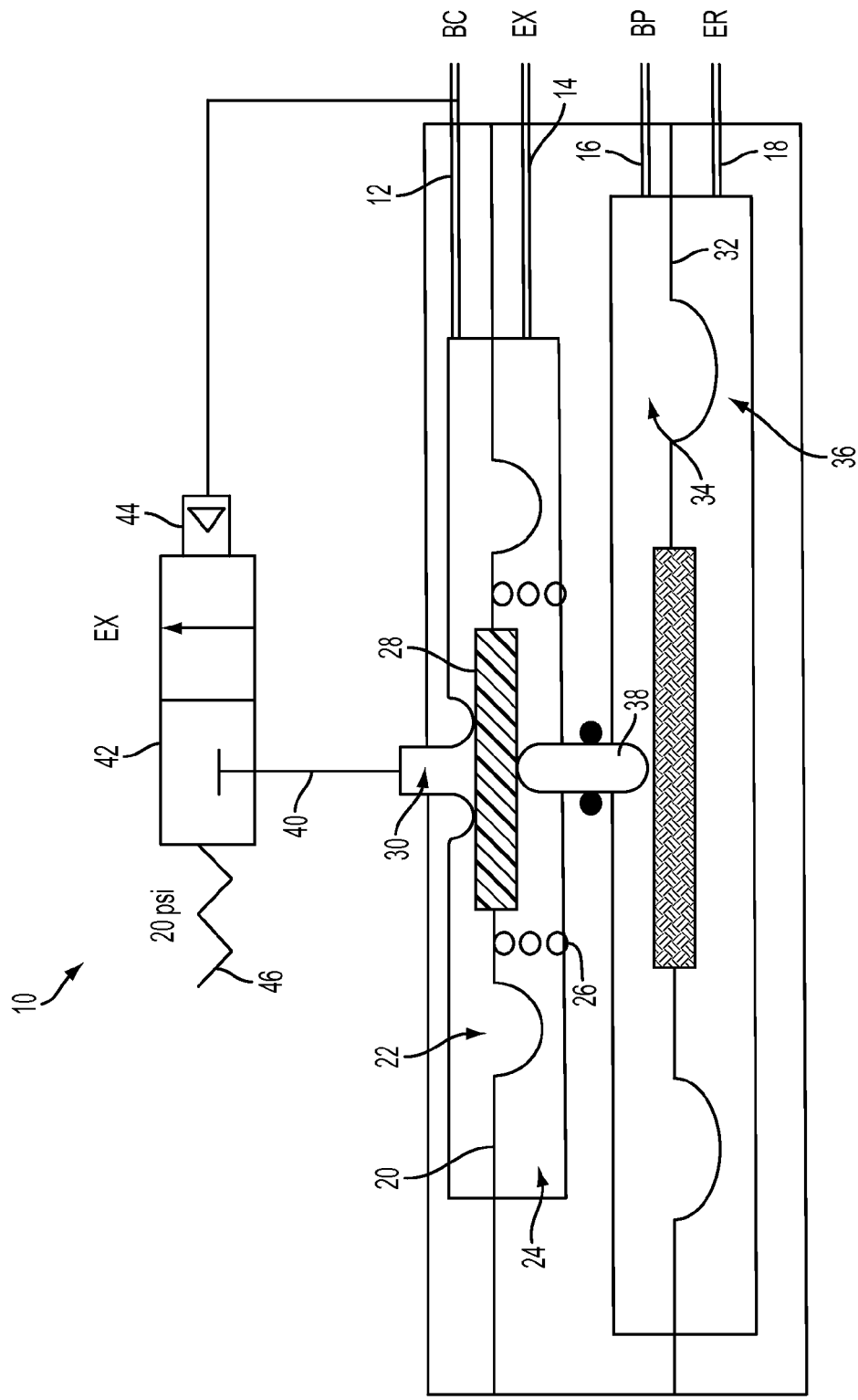
FIG. 1 is a schematic of a brake cylinder limiting valve according to the present invention.

Referring now to the drawings, wherein like reference numerals refer to like parts throughout, there is seen in FIG. 1 a brake cylinder limiting valve 10 for preventing over-pressurization of a brake cylinder. Valve 10 is a 2.5:1 differential pressure limiting valve which has a first portion that pneumatically determines the intended brake cylinder pressure and a second portion that compares the intended brake cylinder pressure to the actual brake cylinder pressure. The 2.5:1 differential pressure is selected to account for the ratio of brake pipe pressure to brake cylinder pressure required to be in an AAR compliance system. More specifically, because of the volumetric relationship between the auxiliary reservoir and the brake cylinder in an AAR braking system, a reduction in the brake pipe pressure will cause an increase in brake cylinder pressure which is 2.5 times the brake pipe reduction. For example, when an operator makes a 10 psi brake pipe reduction to actuate the brakes, the brake cylinder pressure is increased by 25 psi. Thus, it should be recognized that the present invention could be configured for a different differential pressure as desired or required by a non-AAR compliant system or system having different requirements.

As seen in FIG. 1, valve 10 comprises a first port 12 in fluid communication with a source of brake cylinder pressure BC, a second port 14 in fluid communication with an exhaust EX (atmospheric pressure), a third port 16 in fluid communication with a source of brake pipe pressure BP, and a fourth port 18 in communication with a source of emergency reservoir pressure ER. Valve 10 further comprises a first diaphragm 20 separating a first chamber 22 that is in communication with first port 12 from a second chamber 24 that is in communication with second port 14 and exhaust EX. A spring 26 biases diaphragm 20 to move a seat 28 positioned thereon to selectively opens and closes communication between first port 12 and an exhaust port 30. Spring 26 is configured to provide the equivalent biasing force of between 5 and 10 psi.

A second diaphragm 32 is positioned in valve 10 to separate a third chamber 34 in communication with third port 16 and brake pipe pressure BP from a fourth chamber 36 in communication with fourth port 18 and emergency reservoir pressure ER. Movement of second diaphragm 32 is communicated to first diaphragm 20 via a floating pin 38, thereby allowing a decrease in brake pipe pressure BP to adjust the amount of force necessary to open seat 28. The wetted area of second diaphragm 32 separating the emergency reservoir pressure ER chamber 36 and brake pipe pressure BP chamber 34 is selected to be about 2.5 times the wetted area of first diaphragm 32. As a result, valve 10 will not open seat 28 and vent brake cylinder pressure BC to exhaust port 30 unless brake cylinder pressure BC in chamber 22 exceeds both the bias force of spring 26 and 2.5 times any force applied to diaphragm 20 by pin 38 and diaphragm 32, which is the amount of reduction of brake pipe pressure BP in chamber 34. Thus, the first portion of valve 10 comprises an actual brake cylinder pressure feedback that is compared against the intended brake pipe pressure as determined by brake pipe pressure. As a result, valve 10 can determine whether the actual brake cylinder pressure exceeds the intended brake cylinder pressure and exhaust the brake cylinder if it is over pressurized by an amount equal to the bias force of spring 26.

Exhaust port 30 is preferably connected to the inlet 40 of an exhaust valve 42 having a pilot 44 in communication with brake cylinder pressure BC that acts against a valve spring 46 to selectively connected exhaust port 30 with an exhaust EX. Valve spring 46 is configured to provide a biasing force equal to about 20 psi and thus will close exhaust valve 42 if brake cylinder pressure BC falls below about 20 psi. Conventional AAR brake systems include a retainer valve that, when manually activated, will bottle up the brake cylinder pressure by sealing the brake cylinder exhaust. This allows the train driver to bottle up the brakes on the cars, and then make a release and recharge of the brake pipe and all of the control valves on the train while the retainer bottles brake cylinder pressure. Retainers are typically used while descending long grades. By AAR standard, the retainer will bottle 20 psi in the high pressure setting. Exhaust cut-off valve 42 thus disables the brake cylinder limiting valve in retainer operations to comply with AAR standards.

In release and recharge, both the emergency and auxiliary reservoirs are pressurized to the brake pipe pressure, usually 90 psi. During a service brake application, the emergency reservoir pressure is unchanged from the original charge state. The brake cylinder limiting valve thus uses the difference between the emergency reservoir pressure and the brake pipe pressure to determine the brake pipe reduction, which is the brake command signal. The brake reduction is thus compared to the actual brake cylinder feedback pressure.

As explained above, during a normal brake application the brake cylinder pressure BC will be about 2.5 times the brake pipe reduction. Brake cylinder limiting valve 10 will therefore be in force balance and exhaust port 30 will be held closed by valve spring 26, which has a nominal preload of between about 5 and 10 psi. This preload prevents undesired leakage from the brake cylinder limiting valve 10 in the balanced state, and accommodates tolerance variations of the brake system. If brake cylinder pressure BC increases as a result of any undesired leakage into the brake cylinder, such as from the brake pipe, the auxiliary reservoir, or the emergency reservoir, and does so in an amount equal to or greater than the value of spring 26, first diaphragm 20 will move downwardly, as seen in FIG. 1, thereby opening seat 28 and allowing brake cylinder pressure in chamber 22 to escape out of exhaust port 30.

In an emergency brake application, brake pipe pressure is vented to zero psi and the emergency and auxiliary reservoirs and brake cylinder pressures are at equilibrium. Due to the ratios of the wetted areas in brake cylinder limiting valve 10, exhaust port 30 is held firmly closed by seat 28.

While FIG. 1 shows a brake cylinder limiting valve 10 having flexible diaphragms 20 and 32, as well as floating pin 38 to provide force communication, the function of brake cylinder limiting valve 10 could be implemented using other comparable valve structures, such as a combination of pistons and seals that provide the requisite 2.5 to 1 area ratio between the actual brake cylinder feedback portion and the intended brake cylinder pressure determining portion.

Figure 2:
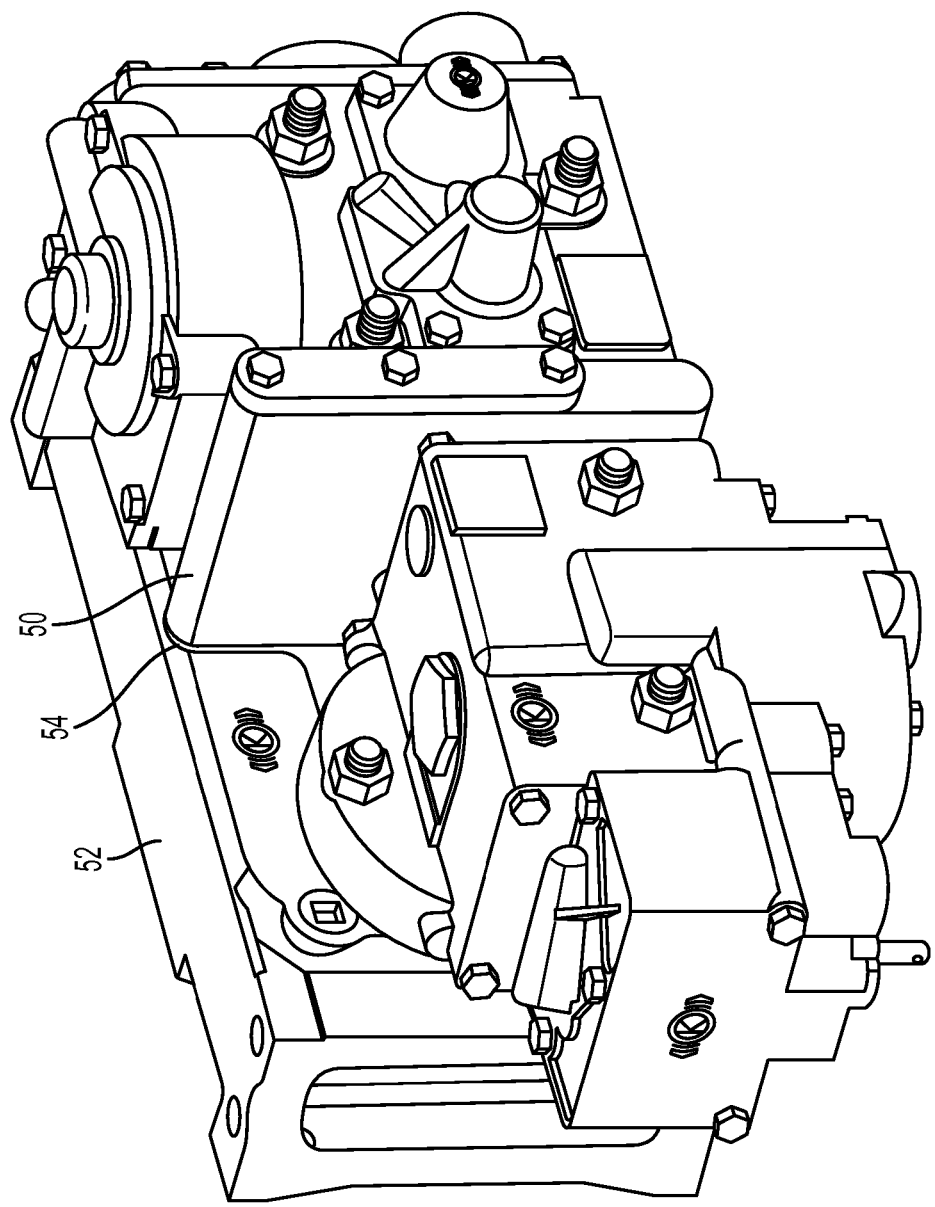
FIG. 2 is a perspective view of an AAR control valve retrofitted in a first configuration with a brake cylinder limiting valve according to the present invention.

As seen in FIG. 2, valve 10 may be provided in a module 50 adapted for interconnection to a single-sided pipe bracket 52 via the existing 4-port interface 54 that is provided for periodic connection to a single car testing device. 4-port interface 54 includes conduits that provide for fluid communication to brake pipe pressure BP, auxiliary reservoir pressure AR, emergency reservoir pressure ER, and brake cylinder pressure BC and can thus provide all needed inputs for valve 10. In FIG. 2, module 50 is connected directly to 4-port interface 54 of pipe bracket 52. As a result, module 53 would have to be removed so that a single car testing device could be connected to 4-port interface 54 for periodic testing of the braking system.

Figure 3:
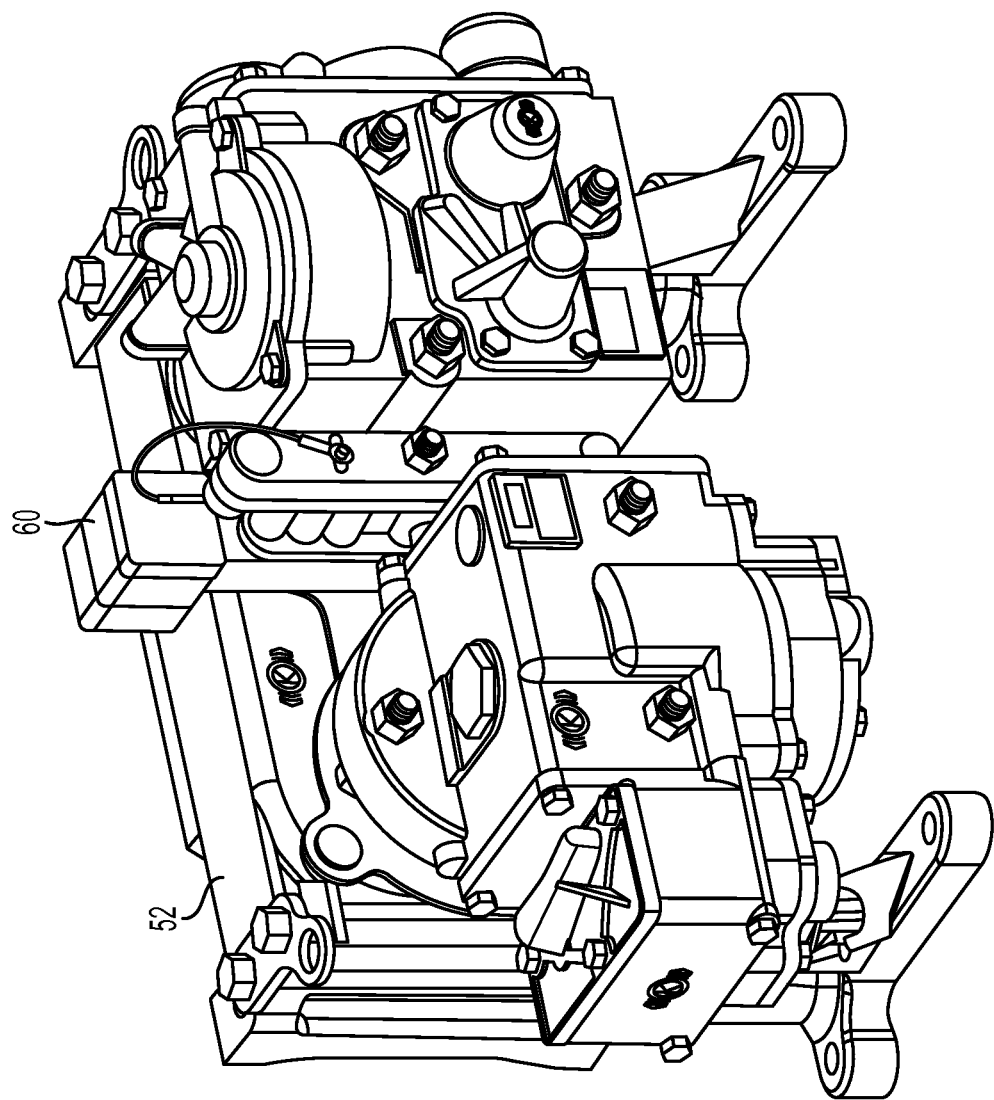
FIG. 3 is a perspective view of an AAR control valve retrofitted in a second configuration with a brake cylinder limiting valve according to the present invention.
Figure 4:
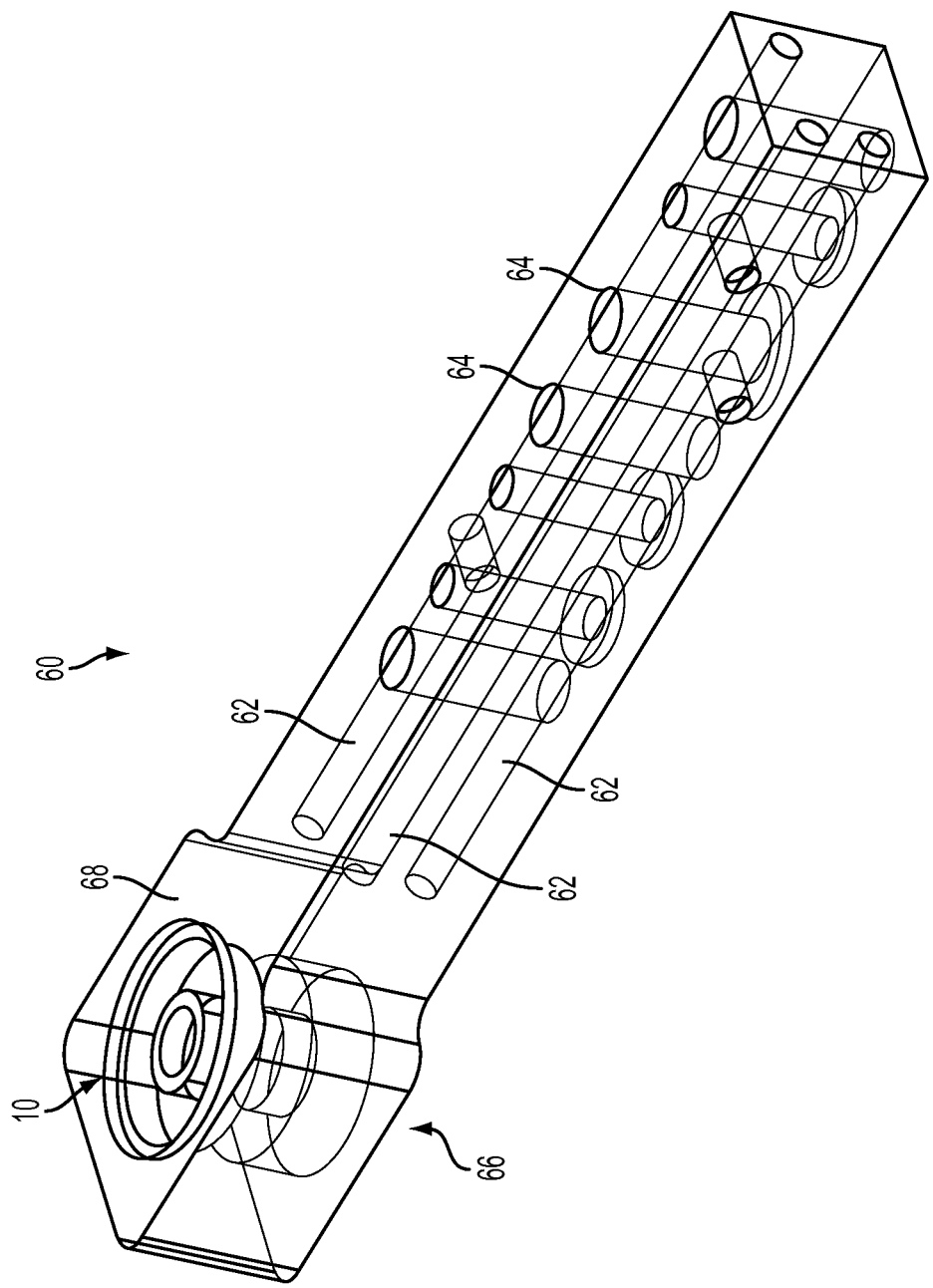
FIG. 4 is a perspective view of a brake cylinder limiting valve adaptor according to the present invention for interconnecting to an AAR control valve.

As seen in FIGS. 3 and 4, valve 10 may be incorporated into an module 60 that is attached directly along a first side 66 to 4-port interface 54 and that contains a series of conduits 62 formed therein to provide fluid communication to valve 10 as well as to a corresponding set of ports 64 on a second side 68 that allow a conventional testing device to be attached to module 60 for periodic testing purposes. Although module 60 is shown in FIG. 3 to be attached to 4-port interface 54 with valve 10 above pipe bracket, module 60 could be configured to position valve 10 below pipe bracket 52. As further seen in FIG. 3, a test adaptor 70 may be bolted over adaptor 60 to allow for connection to a single car testing device.

Figure 5:
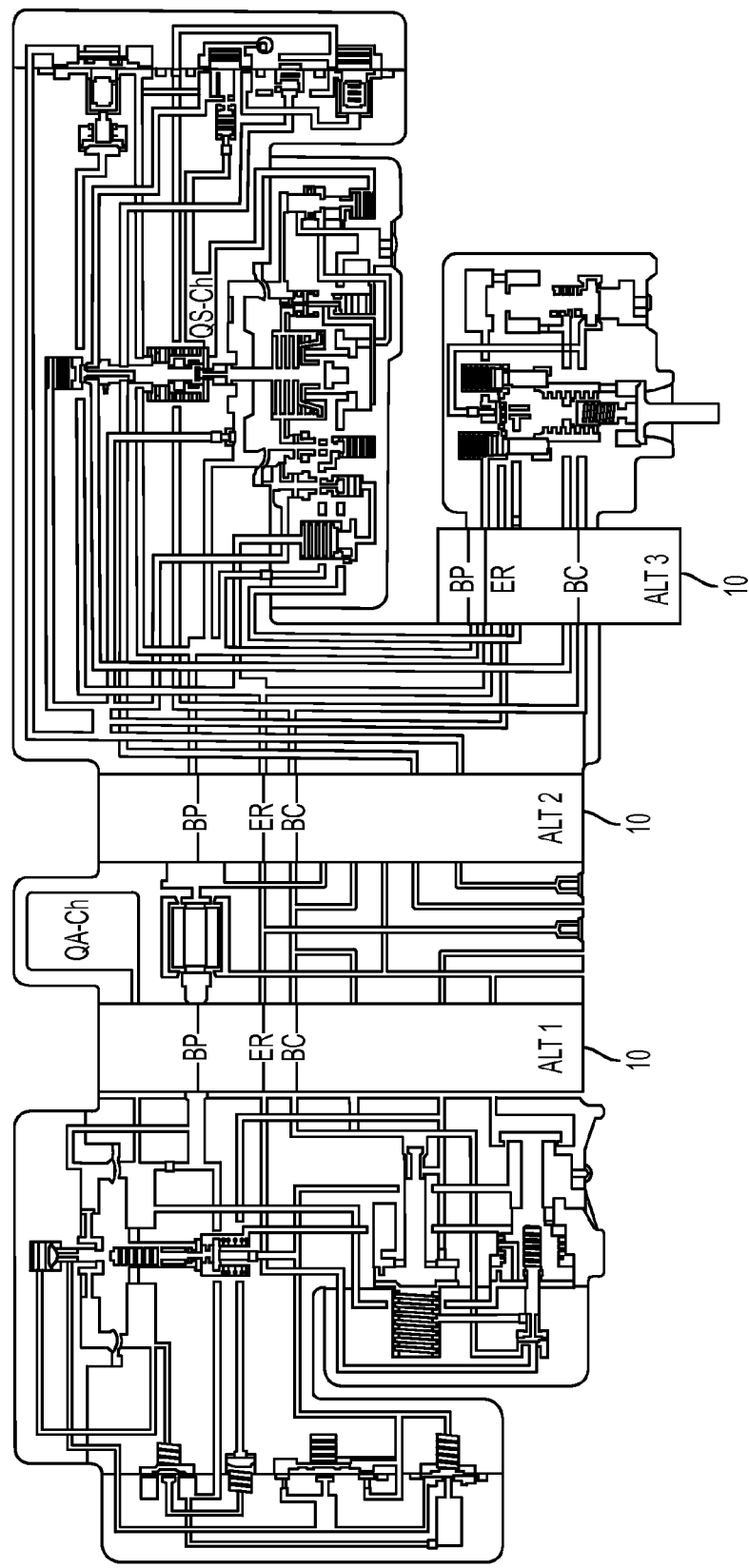
FIG. 5 is a schematic of a brake control valve showing three alternative locations for the installation of a brake cylinder limiting valve according to the present invention.

It should be recognized by those of skill in the art that valve 10 may be configured into any portion of a braking system control valve, such as by redesigning the packaging of the control valve, as a module that interfaces to the release valve interface, or as a module fitted between either the service portion and the pipe bracket or the emergency portion and the pipe bracket (or by including valve 10 in any other location that has pneumatic access to brake pipe, emergency reservoir, and brake cylinder pressures). As seen in FIG. 5, valve 10 may be integrated into one of at least three different locations, Alt 1, Alt 2, and Alt 3, respectively, of a control valve 72.

What is claimed is:

1. A brake cylinder limiting valve, comprising:
   a first portion for interconnection to a source of brake cylinder pressure and having a seat that is moveable between a closed position where the source of brake cylinder pressure is in closed communication with an exhaust and an open position where the source of brake cylinder pressure is in open communication with the exhaust;
   a spring providing a first force biasing the seat into the closed position;
   a second portion for interconnection to a source of brake pipe pressure and a source of emergency reservoir pressure that provides a second force biasing the seat into the closed position when brake pipe pressure is less than emergency reservoir pressure; and
   wherein the first and second forces biasing the seat into the closed position are overcome when the brake cylinder pressure exceeds the difference between the brake pipe pressure and the emergency reservoir pressure by more than a threshold ratio.

2. The valve of claim 1, wherein the threshold ratio is 2.5 to 1.

3. The valve of claim 2, wherein the first portion comprises:
   a first chamber in communication with the source of brake cylinder pressure;
   a second chamber in communication with atmospheric pressure;
   a first diaphragm separating the first and second chambers and having a first wetted area, said diaphragm configured to move the seat between the closed and open positions.

4. The valve of claim 3, wherein the first force comprises between 5 and 10 psi so that the seat will open when the brake cylinder pressure in the first chamber exceeds the biasing of the spring.

5. The valve of claim 4, wherein the second portion comprises:
   a third chamber in communication with the source of brake pipe pressure;
   a fourth chamber in communication with the source of emergency reservoir pressure;
   a second diaphragm separating the third and fourth chambers and having a second wetted area that is greater than the first wetted area by the threshold ratio, said diaphragm being moveable to provide a second force biasing the seat into the closed position.

6. The valve of claim 5, further comprising a floating pin in contact with the first diaphragm and the second diaphragm to communicate the second force to the first diaphragm.

7. The valve of claim 1, further comprising a cut-off valve in communication with the exhaust.

8. The valve of claim 7, wherein the cut-off valve closes the exhaust when the brake cylinder pressure is below a predetermined threshold.

9. The valve of claim 8, wherein the predetermined threshold is twenty psi.

10. The valve of claim 1, further comprising a housing enclosing said valve and having a series of conduits configured to operatively interconnect said valve to a 4-port testing interface, thereby providing the source of brake cylinder pressure, the source of brake pipe pressure, and the source of emergency reservoir pressure.

11. The valve of claim 10, wherein said housing further includes a series of ports configured to operatively connect the conduits of said housing to a 4-port test adaptor in addition to said valve.

12. A method of preventing brake cylinder over-pressurization, comprising the steps of:
    determining an actual brake cylinder pressure using a first portion interconnected to a source of brake cylinder pressure and having a seat that is moveable between a closed position where the source of brake cylinder pressure is in closed communication with an exhaust and an open position where the source of brake cylinder pressure is in open communication with the exhaust;
    biasing the seat into the closed position with a spring;
    determining an intended brake cylinder pressure using a second portion interconnected to a source of brake pipe pressure and a source of emergency reservoir pressure that provides a second force biasing the seat into the closed position when brake pipe pressure is less than emergency reservoir pressure; and
    venting the actual brake cylinder pressure by opening the seat against the first and second biasing forces if the actual brake cylinder pressure exceeds the intended brake cylinder pressure by a predetermined amount.

13. The method of claim 12, wherein the step of determining the intended brake cylinder pressure comprises measuring an amount of reduction in brake pipe pressure relative to emergency reservoir pressure.

14. The method of claim 13, wherein the predetermined amount comprises two and one-half times the amount of reduction in brake pipe pressure.

15. The method of claim 14, wherein the predetermined amount comprises two and one-half times the amount of reduction in brake pipe pressure plus between five and ten psi.

16. The method of claim 15, further comprising the step of using an exhaust cut-off valve to prevent the venting of the actual brake cylinder pressure if the brake pipe pressure is below a predetermined threshold even if the actual brake cylinder pressure exceeds the intended brake cylinder pressure by the predetermined amount.

17. The method of claim 16, wherein the predetermined threshold is twenty psi.

* * * * *